March 7, 1972  F. P. DANIEL  3,647,555
WATER ACTIVATED DRY CHARGED STORAGE BATTERY HAVING BUOYANT
INTERNAL TEAR STRIP PLASTIC BAG CONTAINING
ELECTROLYTE PRODUCING SUBSTANCE
Filed Oct. 3, 1969

United States Patent Office 3,647,555
Patented Mar. 7, 1972

3,647,555
WATER ACTIVATED DRY CHARGED STORAGE BATTERY HAVING BUOYANT INTERNAL TEAR STRIP PLASTIC BAG CONTAINING ELECTROLYTE PRODUCING SUBSTANCE
Fred P. Daniel, North Olmstead, Ohio, assignor to ESB Incorporated
Filed Oct. 3, 1969, Ser. No. 863,579
Int. Cl. H01m *11/00*
U.S. Cl. 136—162                                6 Claims

ABSTRACT OF THE DISCLOSURE

A dry charged storage battery has an internal plastic bag inside of which is a suubstance which in the presence of water will produce the battery's electrolyte. A tear strip connected to the bag becomes accessible from outside the battery through an opening in the battery's cover after water has been added due to the buoyancy of the bag and/or a float attached to the tear strip.

BACKGROUND OF THE INVENTION

Several patents show storage batteries on the inside and beneath the cover of which are bags or vessels holding substances which in the presence of water will produce the batteries' electrolytes. These references differ primarily in the means by which the acid-producing substances are released from the bags. In one the bag has a stopper which is removed and a weakened section which is punctured to permit the enclosed liquid concentrated acid to flow directly onto the electrodes and separators below. In another the bag is punctured at such a location and angle that the enclosed liquid concentrated acid is directed through channels around the electrodes and separators to be diluted in water before contacting the separators. In still another a solid electrolyte producing substance is confined in a bag coated with an organic solvent, which solvent causes the bag to dissolve when water is added.

One reference shows the cover itself, rather than a bag beneath the cover, constituting the electrolyte reservoir.

SUMMARY OF THE INVENTION

This invention provides a new means by which to release the electrolyte-produucing substance from its bag inside the battery. With the present invention the substance is confined in a plastic bag; a tear strip attached to this plastic bag becomes accessible from outside the battery through an opening in the battery's cover after water has been added, due to the buoyancy of the bag and/or a float attached to the tear strip. When the tear strip is pulled the plastic bag is opened to permit the water and the electrolyte-producing substance to come into contact with each other. In some cases the tear strip may be attached to a weakened section of the plastic bag.

DESCRIPTION OF THE PREFERRED EMBODIMENTS

Figure 1:
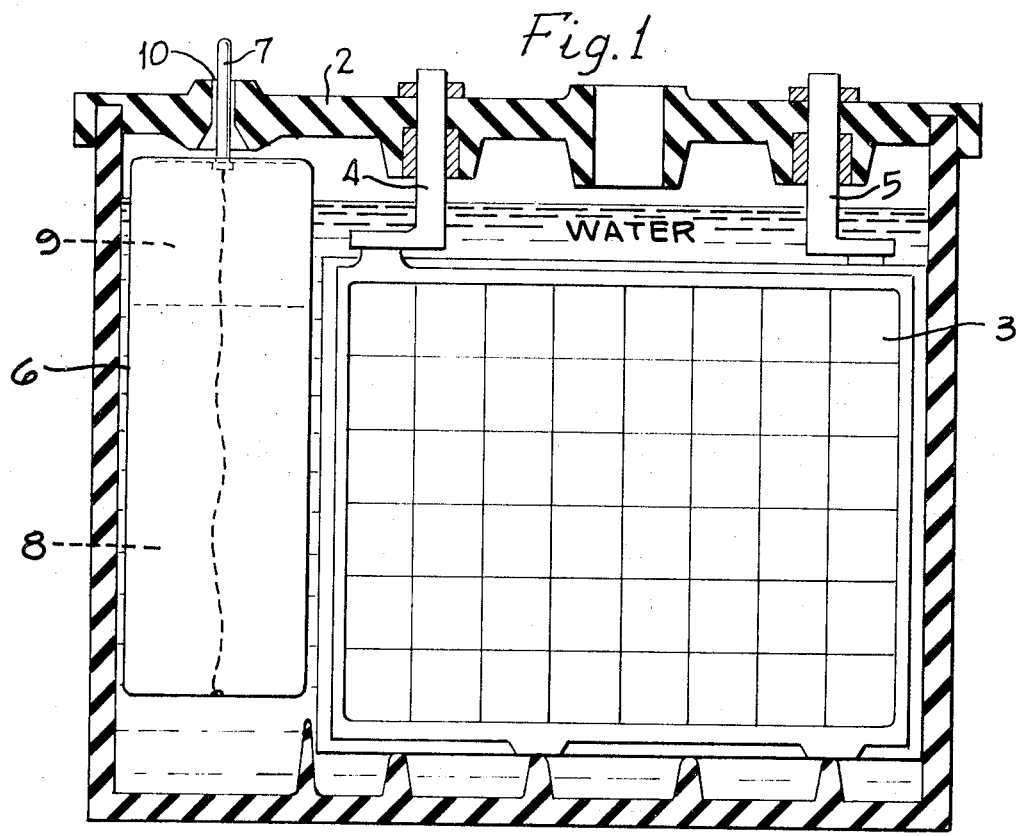
FIG. 1 shows a cross-section of a storage battery showing a plastic bag situated beside the electrodes and separators. The bag, which contains an electrolyte-producing substance, has a tear strip attached to the bag. The bag becomes buoyant and rises upward upon addition of the proper quantity of water, thereby making the tear strip accessible through an opening in the battery's cover.

FIG. 1 shows a battery having a container 1 and a separately or integrally constructed cover 2. Inside the container is a conventional collection of alternately spaced positive and negative dry charged electrodes separated from each other by appropriate separators. The positive electrodes are appropriately electrically connected together in a conventional means, as are the negative electrodes. Collectively the electrodes and separators are identified by the numeral 3. Terminal posts 4 and 5 which function as means for conducting electrical current between the electrodes and the exterior of the container are also shown in the drawing.

Beside the electrodes and separators is a plastic bag 6 to which is extended a tear strip 7. Inside the plastic bag is a substance 8 which in the presence of water will produce electrolyte for the battery in the desired quantity and concentration. Also inside the plastic bag is enough air or other light-weight matter 9 to cause the bag to become buoyant upon addition of the proper amount of water, with the result that the tear strip then becomes accessible through an opening 10 in the cover of the battery.

Figure 2:
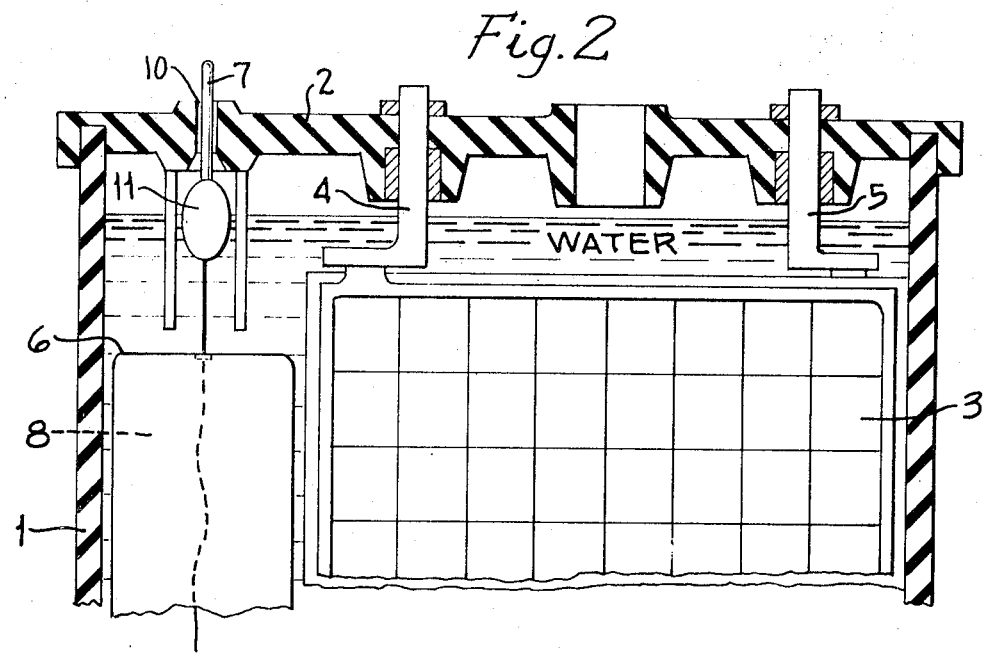
FIG. 2 is similar to FIG. 1 except that the bag and its electrolyte-producing substance do not become buoyant upon the addition of water. Instead a float is attached to the tear strip and causes the strip to become accessible when the proper amount of water has been added.

The construction shown in FIG. 2 differs from that shown in FIG. 1 to the extent that the tear strip rather than the bag becomes buoyant upon the addition of water to cause the tear strip to become accessible from outside the battery. If the tear strip is not made from or filled with a material sufficiently light in weight to cause it to become buoyant, such a material may be connected to the strip to function as a float 11, as shown in FIG. 2.

Although a separate vent opening through which water is normally added is shown in FIGS. 1 and 2 in addition to the opening 10, it will be apparent that the opening 10 may serve as the hole through which water is added so that a separate opening would not be needed.

The section of the bag opened by the tear strip may be linear or in the form of a plug of some shape. The size and configuration of the opening are not to be taken as limitations on this invention. In some cases, the tear strip may be attached to a weakened section of the plastic bag. After the plastic bag is opened and the electrolyte-producing substance is released the bag may either be pulled out of or left remaining in the container.

The electrolyte-producing substance inside the plastic bag may be either solid or liquid. In a lead-acid battery the substance may be concentrated liquid sulfuric acid or a solid which, in the presence water, will cause sulfuric acid to be produced. Such solids include concentrated sulfuric acid contained in a carrier such as aluminum sulfate, magnesium sulfate, calcium silicate, or silica; other solids and gels capable of releasing or producing sulfuric acid when in the presence of water may also be used.

As was stated earlier, battery constructions in which an electrolyte-producing substance is confined in a bag inside the battery container have been known for some time, and various means for opening these bags have been shown. My construction differs by providing a new, simpler opening means, a tear strip connected to the bag, which tear strip can be pulled from outside the battery to open the bag only after the proper quantity of water has been added. The prior addition of water helps ensure that no damage to the separators or other components occurs when the acid is released.

Additional advantages of my construction arise where the substance inside the plastic bag is a solid. Previously such solids have generally been placed loose inside the battery container or somehow incorporated with the separator. In such previous constructions a problem of self-discharge of the battery might arise if the solid substance absorbed enough moisture to form electrolyte, the moisture possibly coming from the atmosphere or from insufficiently dried electrodes; by enclosing the solid substance this undesirable possibility is prevented from occurring. Another problem with some of the previous constructions is that electrolyte production is started as soon as the first small quantity of water is added; if water is not added properly, the heat generated by the rapid and violent electrolyte production and cause permanent damage to the separators. By requiring the battery to be completely or partially filled with water before the electrolyte production is even started, the plastic bag housing the solid substance eliminates or greatly reduces this problem.

I claim:

1. A water activated dry charged storage battery comprising
   (a) a storage battery container having a cover thereon, the cover having an opening therein;
   (b) a collection of alternately spaced positive and negative dry charged electrodes separated from each other by separators, the electrodes and separators being inside the covered container, the positive electrodes being electrically connected together and the negative electrodes likewise being electrically connected together;
   (c) means for conducting electrical current between the positive electrodes and the exterior of the covered container and additional means for conducting current between the negative electrodes and the exterior of the covered container;
   (d) a plastic bag inside the covered container, the bag having a tear strip connected thereto, the top of the tear strip being below the top of the opening in the cover before water has been added to the container but being above the top of the opening in the cover after water has been added to the container; and,
   (e) a substance inside the plastic bag which, when water is added to the interior of the covered container and the tear strip is pulled to tear the plastic bag, will cause battery electrolyte to be produced.

2. The water activated battery of claim 1 in which the bag floats and the top of the tear strip is above the top of the opening in the cover only after water has been added to the container.

3. The water activated battery of claim 1 in which the tear strip floats and the top of the tear strip is above the top of the opening in the cover only after water has been added to the container.

4. The water activated battery of claim 1 in which the tear strip is attached to a weakened section of the plastic bag.

5. The water activated battery of claim 2 in which the tear strip is attached to a weakened section of the plastic bag.

6. The water activated battery of claim 3 in which the tear strip is attached to a weakened section of the plastic bag.

References Cited

UNITED STATES PATENTS

| | | | |
|---|---|---|---|
| 1,566,927 | 12/1925 | Rosen | 136—113 |
| 2,773,927 | 12/1956 | Yeoman | 136—166 |
| 2,832,814 | 4/1958 | Shannon | 136—162 |
| 3,089,622 | 5/1963 | Westlake, Jr. | 222—541 X |
| 3,054,551 | 9/1962 | Holbrook et al. | 229—86 |
| 3,236,697 | 2/1966 | Amiet et al. | 136—162 |
| 3,304,202 | 2/1967 | Sam | 136—6 |
| 3,455,740 | 7/1969 | Duddy | 136—26 |
| 3,483,041 | 12/1969 | Kalen | 136—162 |
| 3,067,275 | 12/1962 | Solomon | 136—153 |
| 3,408,233 | 10/1968 | Parker et al. | 136—153 |

ANTHONY SKAPARS, Primary Examiner

U.S. Cl. X.R.

136—181